Nov. 2, 1926. Re. 16,456

H. SMITH

HEAT EXHAUSTING DEVICE

Original Filed Sept. 7, 1917

Inventor
Henry Smith.

By Blackmore, Spencer & Flint
Attorneys

Reissued Nov. 2, 1926.

Re. 16,456

UNITED STATES PATENT OFFICE.

HENRY SMITH, OF CUMBERLAND, MARYLAND, ASSIGNOR, BY MESNE ASSIGNMENTS, TO GENERAL MOTORS RESEARCH CORPORATION, OF DETROIT, MICHIGAN, A CORPORATION OF DELAWARE.

HEAT-EXHAUSTING DEVICE.

Original No. 1,280,569, dated October 1, 1918. Serial No. 190,238, filed September 7, 1917. Application for reissue filed April 28, 1926. Serial No. 105,301.

As a heat exhausting device, the invention seeks to provide, as its principal object, a compact and effective means for extracting hot air from the crankcases of internal combustion engines and the like, and replacing this with cool air.

A further object is to provide a device of this kind which will be capable of exhausting hot air and admitting cool air to an engine crankcase in such a manner as to preclude danger of admitting dust or grit to the crankcase.

Cheapness of construction and simplicity of structure are other objects of the invention.

Still another object is to provide means in the device whereby the crankcase may be oiled therethrough.

Other and further objects will appear as the detailed description progresses.

While the invention is illustrated in but one of its embodiments, it is not to be considered as restricted to this embodiment. An actual reduction to practice may suggest certain desirable changes or alterations, which the right is claimed to make, in so far as they may be compatible with the spirit of the subjoined claims.

Figure 1:
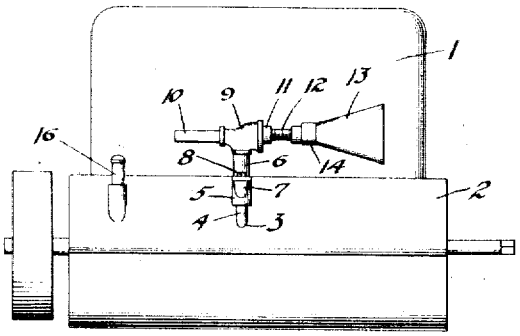
Figure 1 is a side elevation of an internal combustion engine, such as is used with auto-vehicles. This figure shows the manner in which the invention is applied to such an engine.
Figure 2:
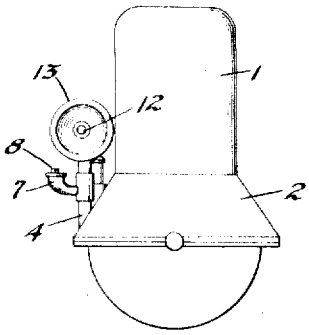
Figure 2 is an end elevation of the structure shown in Figure 1.
Figure 3:
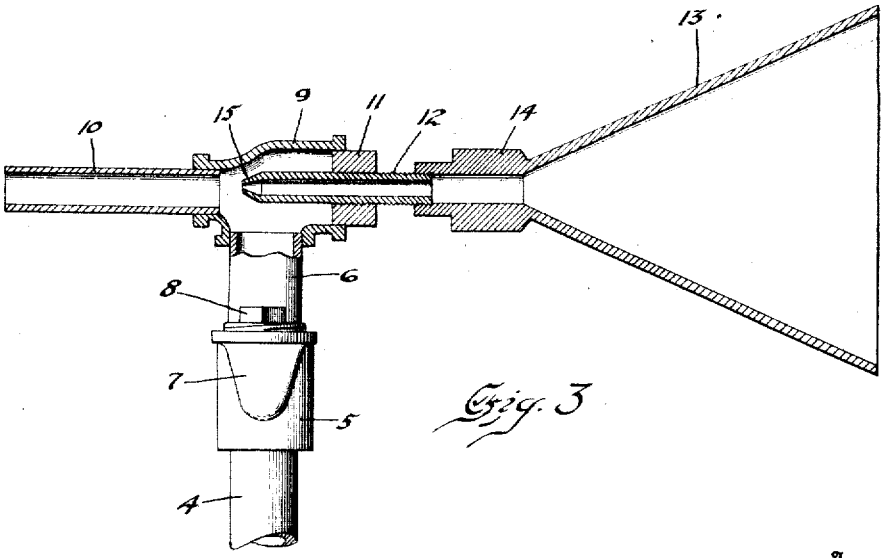
Figure 3 is an enlarged view partly in elevation and partly in section of the invention per se.

In the drawings, 1 is an internal combustion engine provided with a crankcase 2 and the invention is applied to this crankcase by attachment in the hole through which the crankcase is ordinarily oiled, as indicated at 3 in Figure 1.

The invention itself comprises the nipple 4 which is threaded in the hole before referred to as existing in the crank casing 2. On the upper end of this nipple, there is threaded a coupling 5 which receives on its upper end, by threaded engagement therewith, a second nipple 6. A tubular elbow 7 projects from the side of the coupling 5 and its free leg is turned upward, receiving on its end the screw plug 8, which is designed as a closure member for the elbow.

Threaded onto the nipple 6 at its upper end, there is a T 9 which receives in opposite ends of its cross leg, by threaded engagement therewith, the tube 10 and the bushing 11. The tube 12 projects centrally through the bushing 11 and is rigidly fixed therein, this tube extending into the cross leg of the T 9 a sufficient distance to permit it to cross the upper end of the nipple 6. On that end of the tube 12 which projects out of the bushing 11, a funnel 13 is attached, this funnel having a cylindrical hub portion 14 which effects a threaded engagement with the end of the tube 12.

That end 15 of the tube 12 which is within the cross leg of the T 9 is frusto-conical in shape, thus reducing the diameter of the outlet of the tube 12 at this end as compared with the inlet at the other end. Since the tube 12 is designed to take air at its larger end, this frusto-conical end 15 has the effect of creating a vortex at the outlet of the tube which results in a relatively greater suction being set up in the tube 10.

The invention is designed to be applied as shown in Figure 1 and, as the engine shown therein is the kind commonly used on auto-vehicles, the invention is so positioned that, as the engine is moved forward by the vehicle which it drives, the funnel 13 gathers a quantity of cool air currents which are converged at the apex of the funnel and pass through the tube 12 at a high velocity, being further converged as they pass out the frusto-conical end 15 of the tube 12. As these air currents pass out of the tube 12 and through the tube 10, they serve to drive all the still air contained therein out of the latter, creating a partial vacuum which results in a suction through the air outlet from the crank casing 2, which air outlet is composed of the nipples 4 and 6 and their connecting coupling 5. Since the tube 12 enters the cross leg of the T 9 a sufficient distance to extend across the upper end of the nipple 6, any dust or grit that may be gathered by the funnel 13 is driven out through the tube 10 and thus prevented from dropping into the crank casing where it would likely do damage.

Since the device is attached to the crank casing in the hole through which the latter is ordinarily oiled, the elbow 7 and plug 8 are provided for oiling the crank casing at the desired point without disconnecting the device.

Ordinarily auto-vehicles and the like employ internal combustion motors of the four-cycle type which, therefore, are not required to have gas-tight crank casings, as is the case with the two-cycle motors. In the employment of the present invention, it is presumed that the crank casing can receive air through the bearings and between the edges of its connecting sections to take the place of the hot air removed by the device; but in case this means of admitting cool air is not sufficient, a hole may be formed in the crank casing to admit enough cool air to take the place of the hot air removed. This hole is illustrated on the drawing in the form of a breather 16. This breather is of conventional construction and aside from its function in supplying air to the crankcase constitutes no part of my invention.

I claim:

1. In a heat exhausting device for internal combustion engine crank casings and the like, an outlet tube, a T positioned on the top thereof, a suction tube connected to one end of the cross-leg of the T, an inlet tube projecting into said cross-leg through the opposite end thereof, and a funnel attached to the end of the inlet tube, the inlet tube having the opening at its free end reduced as compared with the opening at its other end, whereby air currents may be gathered by the funnel and converged thereby and by the inlet tube to create a suction in and through the suction and outlet tubes.

2. In a heat exhausting device for internal combustion engine crank-casings and the like, an outlet tube designed for attachment to the crank-casing of an engine, said outlet tube having an elbow extending laterally therefrom which elbow provides a means for oiling the crank-casing, a T positioned on the top of the outlet tube, a suction tube connected to one end of the cross-leg of the T, an inlet tube projecting into said cross-leg through the opposite end thereof, and a funnel attached to the end of the inlet tube, the inlet tube having the opening at its free end reduced as compared with the opening at its other end, whereby air currents may be gathered by the funnel and converged thereby and by the inlet tube to create a suction in and through the suction and outlet tubes.

3. In a heat exhausting device for internal combustion engine crank-casings, and the like, an outlet tube, a T positioned on the top thereof, a suction tube connected to one end of the cross-leg of the T, an inlet tube projecting into said cross-leg through the opposite end thereof and extending across the upper end of the outlet tube, and a funnel attached to the end of the inlet tube, the inlet tube having the opening at its free end reduced as compared with the opening at its other end, whereby air currents may be gathered by the funnel and converged thereby and by the inlet tube to create a suction in and through the suction and outlet tubes.

4. In a heat exhausting device for internal combustion engine crankcases, and the like, provided with a plurality of openings therein for communication with the atmosphere, an outlet tube leading from one of said openings, a fitting positioned on the top thereof and including a suction tube communicating with said outlet tube and an inlet tube communicating with said outlet tube and with said suction tube, said inlet tube and suction tube being arranged substantially in line at the point of communication with said outlet tube, and a funnel secured to one end of the inlet tube, whereby air currents may be gathered by the funnel and converged thereby to create a suction in and through the suction and outlet tubes, the air drawn from the crankcase by the suction thus created being replaced by fresh air supplied through the other opening in the crankcase.

5. In a heat exhausting device for internal combustion engine crankcases, and the like, provided with a plurality of openings therein for communication with the atmosphere, an outlet tube leading from one of said openings said outlet tube having an extension provided with a removable closure and serving as means for supplying oil to the crankcase, a fitting positioned on the top thereof and including a suction tube communicating with said outlet tube and an inlet tube communicating with said outlet tube and with said suction tube, said inlet tube and suction tube being arranged substantially in line at the point of communication with said outlet tube, and a funnel secured to one end of the inlet tube whereby air currents may be gathered by the funnel and converged thereby to create a suction in and through the suction and outlet tubes, the air drawn from the crankcase by the suction thus created being replaced by fresh air supplied through the other opening in the crankcase.

6. In a heat exhausting device for internal combustion engine crankcases, and the like, provided with a plurality of openings therein for communication with the atmosphere, an outlet tube leading from one of said openings, a fitting positioned on the top thereof and including a suction tube communicating with said outlet tube and an inlet tube communicating with said outlet tube and with said suction tube and extending across the end of the outlet tube, said inlet tube and suction tube being arranged substantially in line at the point of communication with said outlet tube, and a funnel secured to one end of the inlet tube whereby air currents may be gathered by the funnel and converged thereby to create a suction in and through the suction and outlet tubes, the air drawn from the crankcase by the suction thus created being replaced by fresh air supplied through the other opening in the crankcase.

7. In a heat exhausting device for internal combustion engine crankcases, and the like, provided with an opening in communication with the atmosphere and with an air outlet, a suction tube communicating with said air outlet, and an inlet tube communicating with said air outlet and with said suction tube, said inlet tube and suction tube being arranged substantially in line at the point of communication with said air outlet, said inlet tube having a funnel at its outer end whereby air currents may be gathered by the funnel and converged thereby to create a suction in and through the suction tube and air outlet, the air drawn from the crankcase by the suction thus created being replaced by fresh air supplied through the opening in the crankcase.

8. In a heat exhausting device for internal combustion engine crankcasings, and the like, provided with an opening therein for communication with the atmosphere and with an air outlet, a suction tube communicating with the air outlet, an inlet conduit communicating with the air outlet and with the suction tube, said inlet conduit having an outer portion of enlarged cross-section and an inner portion of reduced cross-section to provide a funnel, the inner end of the inlet conduit being arranged in close proximity to the inner end of the suction tube, whereby air currents may be gathered by the funnel and converged thereby to create a suction tube in and through the suction and air outlet, the air drawn from the crankcase by the suction thus created being replaced by fresh air supplied through the other opening in the crankcase.

9. Means for removing heated air from the crankcase of an automobile engine comprising, in combination, with a crankcase having an air inlet opening, a pipe for supplying oil to the crankcase, a closure for the oil inlet end of said pipe, an air outlet leading from said pipe below the oil inlet end thereof, an air inlet conduit having a funnel at its inlet end to converge the current of air passing therethrough, the outlet end of said air inlet conduit being positioned adjacent to said air outlet from the filler pipe to cause suction therein and to draw heated air from said crankcase therethrough.

HENRY SMITH.

CERTIFICATE OF CORRECTION.

Reissue Patent No. 16,456, granted November 2, 1926.

to HENRY SMITH,

It is hereby certified that error appears in the printed specification of the above mentioned patent requiring correction as follows: Page 3, line 42, claim 8, strike out the word "tube" and insert the same to follow after the word "suction" in same line; and that the said Letters Patent should be read with this correction therein that the same may conform to the record of the case in the Patent Office.

Signed and sealed this 8th day of February, A. D. 1927.

Seal.

William A. Kinnan,
Acting Commissioner of Patents.